(12) United States Patent
Weaver et al.

(10) Patent No.: US 10,620,754 B2
(45) Date of Patent: Apr. 14, 2020

(54) TOUCH-SENSITIVE DEVICE WITH ELECTRODES HAVING LOCATION PATTERN INCLUDED THEREIN

(75) Inventors: Billy L. Weaver, Eagan, MN (US); Brock A. Hable, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 601 days.

(21) Appl. No.: 12/951,376

(22) Filed: Nov. 22, 2010

(65) Prior Publication Data

US 2012/0127114 A1 May 24, 2012

(51) Int. Cl.
*G06F 3/03* (2006.01)
*G06F 3/0354* (2013.01)
*G06F 3/044* (2006.01)

(52) U.S. Cl.
CPC ............ *G06F 3/044* (2013.01); *G06F 3/0321* (2013.01); *G06F 3/03545* (2013.01); *G06F 2203/04112* (2013.01)

(58) Field of Classification Search
CPC .... G06F 3/0321; G06F 3/03545; G06F 3/044; G06F 2203/04112
USPC .................................................. 345/173–183
See application file for complete search history.

(56) References Cited

U.S. PATENT DOCUMENTS

| | | |
|---|---|---|
| 3,106,707 A | 10/1963 | Thompson |
| 5,051,736 A | 9/1991 | Bennett |
| 5,852,434 A | 12/1998 | Sekendur |
| 6,377,249 B1 | 4/2002 | Mumford |
| 6,502,756 B1 | 1/2003 | Fåhraeus |
| 6,548,768 B1 | 4/2003 | Pettersson |
| 6,570,104 B1 | 5/2003 | Ericson |
| 6,586,588 B1 | 7/2003 | Cimecioglu |
| 6,666,376 B1 | 12/2003 | Ericson |
| 6,674,427 B1 | 1/2004 | Pettersson |
| 6,698,660 B2 | 3/2004 | Fåhraeus |
| 6,722,574 B2 | 4/2004 | Skantze |
| 6,732,927 B2 | 5/2004 | Olsson |
| 6,814,642 B2 | 11/2004 | Siwinski |
| 6,947,033 B2 | 9/2005 | Fåhraeus |
| 6,966,495 B2 | 11/2005 | Lynggaard |
| 7,035,429 B2 | 4/2006 | Andreasson |
| 7,050,653 B2 | 5/2006 | Edsöet |
| 7,054,487 B2 | 5/2006 | Ericson |
| 7,072,529 B2 | 7/2006 | Hugosson |
| 7,143,952 B2 | 12/2006 | Ericson |

(Continued)

FOREIGN PATENT DOCUMENTS

| | | |
|---|---|---|
| EP | 1222604 B1 | 7/2002 |
| EP | 1405255 B1 | 4/2004 |

(Continued)

OTHER PUBLICATIONS

Hofer; "Digisketch: Taming Anoto Technology on LCDs", EICS '10, Jun. 19-23, 2010, Berlin, Germany; ACM 978-1-4503-0083-4/10/06.

(Continued)

*Primary Examiner* — Ryan A Lubit
(74) *Attorney, Agent, or Firm* — Clifton F. Richardson; Steven A. Bern

(57) ABSTRACT

A conductive element in a touch sensitive device, such as an electrode in a mutual capacitive touch sensor, that includes conductors arranged in a location pattern that may be sensed and analyzed, and a position on the touch sensor determined therefrom.

13 Claims, 3 Drawing Sheets

(56) References Cited

U.S. PATENT DOCUMENTS

| | | |
|---|---|---|
| 7,167,164 B2 | 1/2007 | Ericson |
| 7,172,131 B2 | 2/2007 | Pettersson |
| 7,175,095 B2 | 2/2007 | Pettersson |
| 7,239,306 B2 | 7/2007 | Fåhraeus |
| 7,248,250 B2 | 7/2007 | Pettersson |
| 7,281,668 B2 | 10/2007 | Pettersson |
| 7,288,753 B2 | 10/2007 | Cok |
| 7,293,697 B2 | 11/2007 | Wiebe |
| 7,295,193 B2 | 11/2007 | Fåhraeus |
| 7,422,154 B2 | 9/2008 | Ericson |
| 7,588,191 B2 | 9/2009 | Pettersson |
| 7,646,377 B2 | 1/2010 | Geaghan |
| 7,671,850 B2 | 3/2010 | Fermgård |
| 7,672,513 B2 | 3/2010 | Björklund |
| 2002/0167270 A1 | 11/2002 | Siwinski et al. |
| 2003/0066896 A1* | 4/2003 | Pettersson et al. .......... 235/494 |
| 2004/0095337 A1* | 5/2004 | Pettersson .......... G06F 3/03545 345/179 |
| 2004/0113898 A1* | 6/2004 | Pettersson et al. .......... 345/179 |
| 2005/0003590 A1 | 1/2005 | Blees |
| 2006/0139338 A1* | 6/2006 | Robrecht .......... G06F 3/0488 345/175 |
| 2006/0242562 A1* | 10/2006 | Wang .......... G06F 3/0321 715/210 |
| 2007/0236618 A1 | 10/2007 | Maag et al. |
| 2008/0191016 A1* | 8/2008 | Lapstun .......... G06F 3/03545 235/454 |
| 2009/0034850 A1* | 2/2009 | Pilu .......... G06F 3/03545 382/225 |
| 2009/0218310 A1* | 9/2009 | Zu .......... B82Y 10/00 216/11 |
| 2010/0001962 A1* | 1/2010 | Doray .......... G06F 3/0421 345/173 |
| 2010/0001963 A1 | 1/2010 | Doray |
| 2010/0134422 A1 | 6/2010 | Borras |
| 2011/0102361 A1* | 5/2011 | Philipp .......... G06F 3/044 345/174 |
| 2011/0310037 A1* | 12/2011 | Moran .......... G06F 3/0412 345/173 |
| 2012/0086660 A1 | 4/2012 | Moran et al. |

FOREIGN PATENT DOCUMENTS

| | | |
|---|---|---|
| EP | 1444646 B1 | 8/2004 |
| EP | 1459244 B1 | 9/2004 |
| EP | 1697880 B1 | 9/2006 |
| JP | 60-181913 | 9/1985 |
| KR | 10-2010-0070231 | 6/2010 |
| KR | 2010-0090669 | 8/2010 |
| WO | WO 2000/73887 A1 | 12/2000 |
| WO | WO 2001/16691 A1 | 3/2001 |
| WO | WO 2001/16872 A1 | 3/2001 |
| WO | WO 2001/48590 A1 | 7/2001 |
| WO | WO 2001/48592 A1 | 7/2001 |
| WO | WO 2001/48654 A1 | 7/2001 |
| WO | WO 2001/61455 A1 | 8/2001 |
| WO | WO 2001/71461 A1 | 9/2001 |
| WO | WO 2001/71654 A1 | 9/2001 |
| WO | WO 2001/74598 A1 | 10/2001 |
| WO | WO 2001/75783 A1 | 10/2001 |
| WO | WO 2001/95091 A1 | 12/2001 |
| WO | WO 2002/39373 A1 | 5/2002 |
| WO | WO 2002/093467 A1 | 11/2002 |
| WO | WO 2003/001441 A1 | 1/2003 |
| WO | WO 2006/001769 A1 | 1/2006 |
| WO | WO 2006/004505 A1 | 1/2006 |
| WO | WO 2006/137798 A1 | 12/2006 |
| WO | WO 2010-099132 | 9/2010 |

OTHER PUBLICATIONS

U.S. Appl. No. 12/951,444, filed Nov. 22, 2010, "Method of Making Touch-Sensitive Device With Electrodes Having location Pattern Included Therein".

Lennhoff N.; "Laser Patterning for Touch Screen Manufacture"; 2005, 3M Touch Systems; PWE1; 3 pages.

Love et al.; "Self-Assembled Monolayers of Thiolates on Metals as a Form of Nanotechnology", American Chemical Society, Chemical Reviews; Mar. 25, 2005, vol. 105, No. 4, pp. 1103-1169.

Michel et al.; "Printing Meets Lithography: Soft Approaches to High-Resolution Printing", IBM Journal of Research and Development, Sep. 2001, vol. 45, No. 5, pp. 697-719.

International Search Report, Form PCT/ISA/210, PCT/US2011/061299, International Filing Date—dated Nov. 18, 2011, 4 pages.

* cited by examiner

TOUCH-SENSITIVE DEVICE WITH ELECTRODES HAVING LOCATION PATTERN INCLUDED THEREIN

BACKGROUND

Touch sensitive devices allow a user to conveniently interface with electronic systems and displays by reducing or eliminating the need for mechanical buttons, keypads, keyboards, and pointing devices. For example, a user can carry out a complicated sequence of instructions by simply touching an on-display touch screen at a location identified by an icon.

There are several types of technologies for implementing a touch sensitive device including, for example, resistive, infrared, capacitive, surface acoustic wave, electromagnetic, near field imaging, etc. Capacitive touch sensing devices have been found to work well in a number of applications. In many touch sensitive devices, the input is sensed when a conductive object in the sensor is capacitively coupled to a conductive touch implement such as a user's finger. Generally, whenever two electrically conductive members come into proximity with one another without actually touching, a capacitance is formed therebetween. In the case of a capacitive touch sensitive device, as an object such as a finger approaches the touch sensing surface, a tiny capacitance forms between the object and the sensing points in close proximity to the object. By detecting changes in capacitance at each of the sensing points and noting the position of the sensing points, the sensing circuit can recognize multiple objects and determine the characteristics of the object as it is moved across the touch surface.

There are two known techniques used to capacitively measure touch. The first is to measure capacitance-to-ground, whereby a signal is applied to an electrode. A touch in proximity to the electrode causes signal current to flow from the electrode, through an object such as a finger, to electrical ground.

The second technique used to capacitively measure touch is through mutual capacitance. Mutual capacitance touch screens apply a signal to a driven electrode, which is capacitively coupled to a receiver electrode by an electric field. Signal coupling between the two electrodes is reduced by an object in proximity, which reduces the capacitive coupling.

Users are increasingly demanding functionalities beyond merely recognizing a touch to the surface of the touch-sensitive device. Such other functionalities include as handwriting recognition and direct note taking (using, for example, a stylus).

Reference is made to US Patent Publication No. 2010/0001962 (Doray), which describes a multi-touch display system that includes a touch panel having a location pattern included thereon.

SUMMARY

Embodiments disclosed herein describe a conductive element in a touch screen, the conductive element itself including a location pattern that may be recognized by a suitably configured sensor, such as a camera or other sensing device. The conductive element may be an electrode in a touch sensor, which in some embodiments would eliminate the need for a further layer that includes a location pattern.

In one embodiment, a conductive element in a touch sensitive device is described, the conductive element comprising conductors arranged in a location pattern, wherein the location pattern includes unique location indicia wherein unique locations in the location pattern are identifiable from corresponding portions of the unique location indicia.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

Embodiments described herein may be more completely understood in consideration of the following detailed description in connection with the accompanying drawings, in which:

FIG. 4 schematically illustrates detail of electrodes of a touch screen;

In the figures, like reference numerals designate like elements.

DETAILED DESCRIPTION

Figure 1:
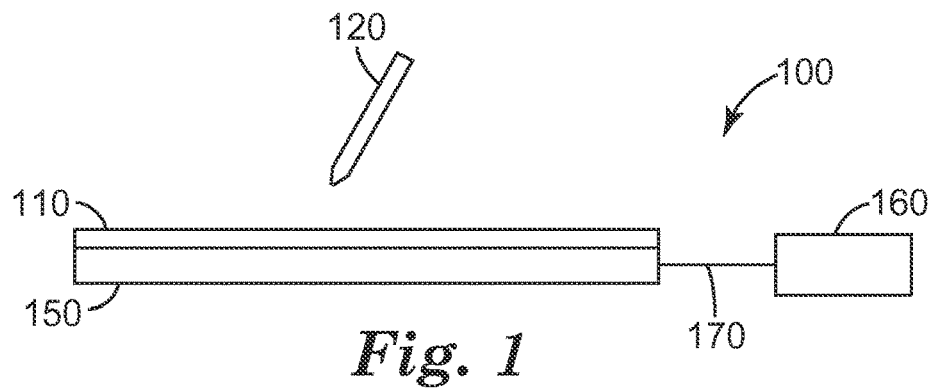
FIG. 1 schematically illustrates a digitizer system.

Embodiments described herein relate to a digitizer system that includes, embedded within a microconductor pattern that comprise electrodes in touch sensor, a location pattern that may be sensed with a detection device, and based on that sensing, a location relative to the electrode, and thus in some embodiments the touch sensor, determined. Microconductors are conductive features comprised of, for example, elemental metal, metal alloys, intermetallic compounds, metal oxides, metal sulfides, metal carbides metal nitrides, and combinations thereof. Microconductors are preferably formed of gold, silver, palladium, platinum, rhodium, copper, nickel, iron, indium, tin, tantalum, as well as mixtures, alloys, and compounds of these elements.

The electrodes are referred to as transparent, even though they may to some degree reduce the amount of visible light that reaches a viewing position, for example by introducing some coloration. Location patterns are patterns that include unique location indicia that uniquely define an area of the location pattern. Position detection can be performed even if the touch sensor is in a non-active state (i.e., it is "off"), as its functioning does not in some embodiments require active components in the location pattern.

In some embodiments, the inclusion of a location pattern in the constituent components of the electrodes themselves may in reduce or eliminate the need for a further location pattern, which itself may require the need for additional layers in a sensor stack, or may negatively interfere with transmisivity of display images from behind the touch sensor.

Digitizer systems disclosed herein utilize a location pattern that may be sensed with a detection device. The location pattern may be a patterned microconductor of the kind described in US Patent Application Publication No. 2009-0218310, "Methods of Patterning a Conductor on a Substrate" (Zu and Frey; hereinafter Zu), the disclosure of which is incorporated by reference in its entirety. Generally, Zu teaches a method of patterning a conductor on a substrate, which results in an electrically conductive micropattern comprised of a metal. This metal pattern may, as taught herein, be embedded with a location pattern. A detection device may sense the metal pattern, either by sensing visible light reflected from the pattern, or by sensing other wavelengths. For example, the metal pattern that includes the location pattern may be comprised of compounds that absorbs or reflects radiation in the visible spectrum, or infrared radiation (IR), or ultraviolet (UV) radiation. The metal pattern that includes the location pattern may also be coated with a layer that provides the same feature.

A detection device, for example one fashioned as a stylus, that incorporates an optical imaging system sensitive to IR, for example, can be used to read the location pattern to determine absolute position and movement of the stylus. In order to read the location pattern, the location pattern can be exposed to IR, which can originate from behind the digitizer (for example, from heat generated by a display or other light source) or from in front of the digitizer (for example, emitted from the detection device itself). Similar techniques can be used with other types of radiation (visible, UV, etc.).

Digitizers disclosed herein may be useful in systems that can benefit from an absolute coordinate input device. In exemplary embodiments, digitizers disclosed herein can be incorporated into any system that includes electrodes that are used to sense a touch or near touch. For example, a projected capacitive touch screen that includes X- and Y-electrodes may benefit from the incorporation of a location pattern as described herein, to facilitate additional support of one or a plurality of styli. The electrodes of the touch screen, that include a location pattern, could be sensed with a detection device, which then provides (via a radio connection to the computer or otherwise), information indicative of the location pattern, and the computer then determines, based on this information, the position of the stylus relative touch surface. If the touch screen is transparent, it can be placed in front of a display, and facilitate interaction with the display. Additionally, surface-capacitive touch screens, which typically employ a continuous resistive layer of a conductive oxide, could instead include a continuously patterned surface that includes a location pattern.

Technologies exist where a stylus with imaging sensor can follow visible coded grid printed on a piece of paper, as disclosed in for example U.S. Pat. Nos. 5,051,736; 5,852,434; 6,502,756; 6,548,768; 6,570,104; 6,586,588; 6,666,376; 6,674,427; 6,698,660; 6,722,574; and 6,732,927, each of which are incorporated wholly into this document by reference. Inks, some transparent, that could be coated onto, or possibly overlaid upon, the location pattern are described in US Patent Publication No. 2006/0139338 (Robrecht), which is hereby incorporated by reference in its entirety.

FIG. 1 is a drawing of a digitizer system 100 that includes touch sensor 110 positioned over a display 150 that is viewable through touch sensor 110. Touch sensor 110 includes transparent electrodes comprised of conductive elements arranged in a location pattern, the location pattern including unique location indicia. Detection device 120 senses the unique location indicia and uses electronics included in detection device 120 to determine therefrom the coordinates of the tip of detection device 120 relative to touch sensor 110 (and thus display 150). Alternatively, detection device 120 may provide to system electronics 160, via signal transmission channel 170, information indicative of the sensed location pattern, and the system electronics 160 may determine therefrom the position of the detection device 120 tip. System electronics 160 may then provide information indicative of the location of detection device 120 to a communicatively coupled computer (not shown in FIG. 1), which is coupled to display 150. Graphics shown on display 150 may be updated to include information indicative of the sensed position of detection device 120; for example, a cursor may move on display 150 in a manner synchronized with the movement of detection device 120 by a user.

Detection device 120 includes an optical imaging system, such as a camera or charge coupled device, in some embodiments additionally including lenses, apertures, and other components incident to such an imaging system. The optical imaging system resolves the location pattern included in the transparent electrodes of display 150. Detection devices suitable for use in the system described in FIG. 1 may include, for example, that described in U.S. Pat. No. 7,588,191 (Pettersson et al.), column 15, line 5 through line 29, and in line 44 through line 67 (the entire Pettersson disclosure is incorporated by reference herein); or that described in U.S. Pat. No. 7,672,513 (Bjorklund et al.), which describes an apparatus for position decoding, and is wholly incorporated by reference herein. Other detection devices that may be suitable for use in a system as described herein may be available from Anoto AB, a Swedish company that makes, inter alia, detection devices of the type referenced herein.

Detection device 120 may be communicatively coupled to system electronics 160 via signal transmission channel 170, which may be wired or wireless. If wireless, additional antennae and circuitry (not shown in FIG. 1) may be additionally included, and may implement the communications specification and protocols associated with the standard specified under the trade name "Bluetooth."

Display 150 can be any addressable electronic display such as a liquid crystal display (LCD), cathode ray tube, organic electroluminescent display, plasma display, electrophoretic display, and the like. Additionally display 150 could be a static image or graphics, or a non-addressable electronic display (such as an electronically illuminated sign), provided alone or in combination with an addressable electronics display.

System electronics 160, in addition to receiving information from detection device 160, may be configured to drive some electrodes that are included in touch sensor 110, then receive sense signals which are indicative of capacitances between various electrodes included in touch sensor 110. Changes values indicative of such capacitances are indicative of touches or near-touches by objects such as fingers. Integrated circuits are available drive system electronics 160. For example, Cypress Semiconductor markets a touch screen controller sold under the name "TrueTouch Touch Screen Controllers" that may be configured to drive touch sensor 110 and resolve touch-related information. Other electronics are available in the market.

Figure 2:
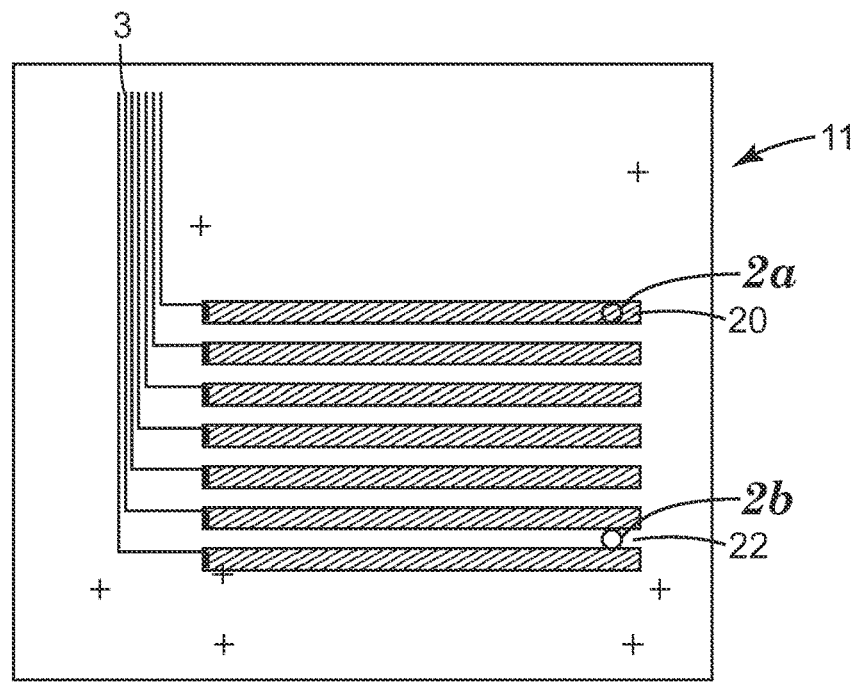
FIG. 2 schematically illustrates electrodes of a touch screen.

FIG. 2 shows schematically illustrates a layer 11 of a touch sensor, such as touch sensor 110. Layer 11 includes a plurality of row electrodes 20 arranged relatively parallel with one another (though they may be arranged in other configurations). Row electrodes 20 are electrically coupled to lead lines 3, which communicatively couple to a tail (not shown in FIG. 2), which in turn communicatively couples to electronics 160. Layer 11 also includes, between rows, separation rows 22, which in part serve to electrically isolate row electrodes 20 from one another. The components of layer 11 are typically on a further layer of some carrier material, such as polyester or glass. The process by which to pattern the components of layer 11 is described in detail in Zu, which was earlier incorporated by reference.

Figure 2A:
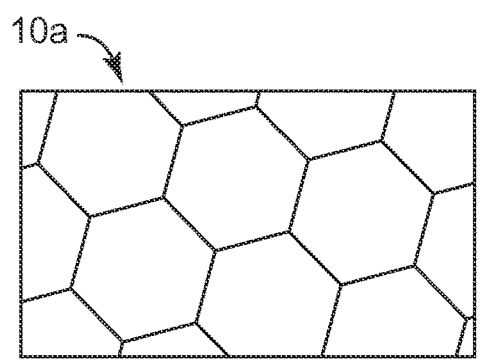
FIG. 2a schematically illustrates detail of electrodes of a touch screen.
Figure 2B:
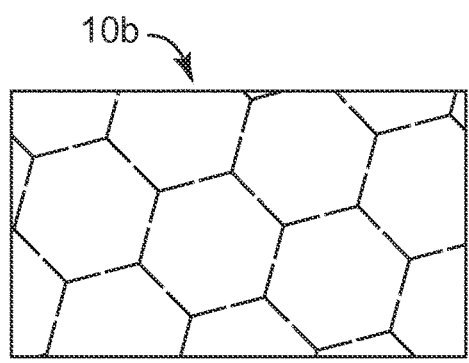
FIG. 2b schematically illustrates detail of a separation row of electrodes of a touch screen.

FIG. 2a shows an exploded view of microconductor pattern 2a (FIG. 2) that comprises a portion of row electrode 20. The microconductor pattern in FIG. 2a comprises a continuous honeycomb pattern. FIG. 2b shows an exploded view of microconductor pattern 2b (FIG. 2) that comprises a portion of separation row 22. The honeycomb pattern is discontinuous, including gaps, which electrically isolate the microconductors.

The microconductor pattern shown in FIGS. 2a and 2b (and by extension FIG. 2) contains repeating pattern of substantially identical shapes (in this case regular hexagons), and does not include a location pattern.

Figure 3:
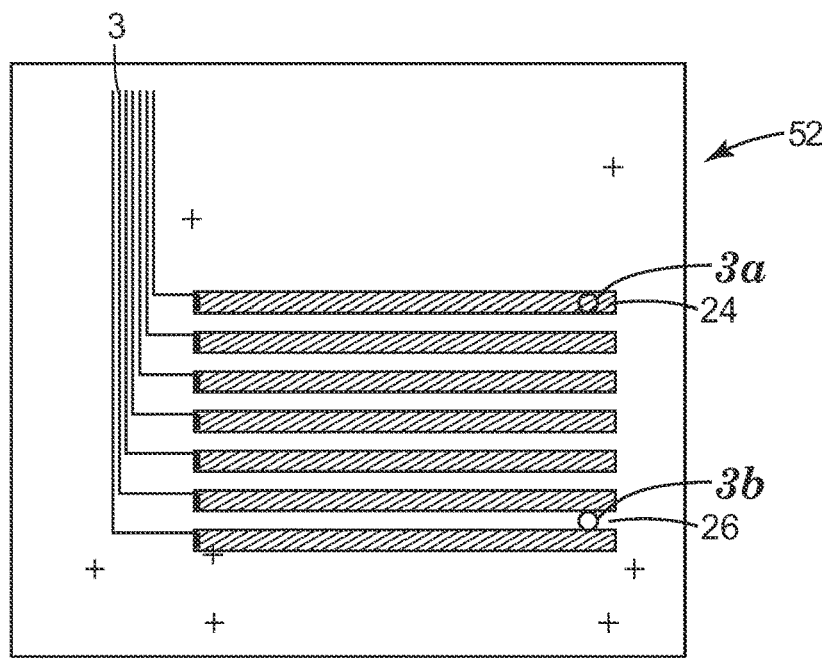
FIG. 3 schematically illustrates electrodes of a touch screen.
Figure 3A:
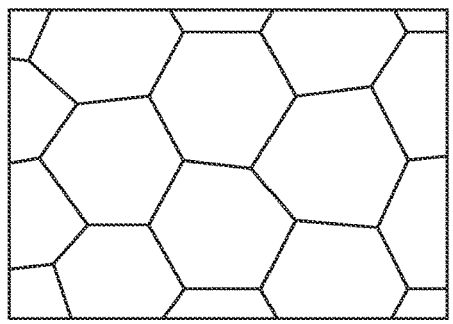
FIG. 3a schematically illustrates detail of electrodes of a touch screen.

FIG. 3 is similar to FIG. 2, except that in FIG. 3 (showing layer 52 of a touch sensor) the row electrodes 24 do include a location pattern in the conductive elements that comprise the microconductor pattern (which may be seen in further detail in FIG. 3a, which shows an exploded view of microconductor pattern 3a in FIG. 3). Similarly, the separation row 26 includes a similar location pattern (which may be seen in further detail in FIG. 3b, which shows an exploded view of microconductor pattern 3b in FIG. 3).

Figure 3B:
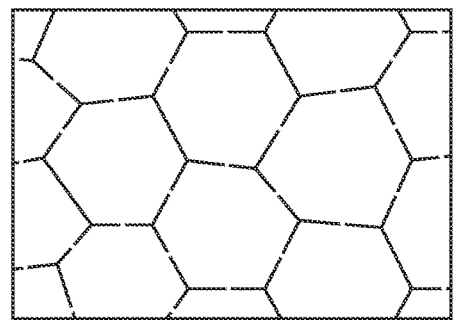
FIG. 3b schematically illustrates detail of a separation row of electrodes of a touch screen.

As may be seen from FIGS. 3a and 3b, the hexagons contained in the micropattern are not regular, and instead have sides of differing dimensions. U.S. Pat. No. 7,172,131 (Pettersson et al.) describes a hexagonal raster pattern and how it may be encoded with location information, and was earlier incorporated by reference into this disclosure. The modification of the vertices may be accomplished in a fairly structured manner. If the location of each vertex can be moved one unit to the left or right of where its location would be if the hexagon were regular, then each vertex can have one of five possible positions.

A hexagon having six vertices, each with five possible locations provides $6^5$ or 7,776 possible unique hexes. Additionally, each hexagon has six nearest neighboring hexagons. If the location pattern of the nearest neighbors is part of the location encoding information, then the number of unique location patterns becomes $7,776^6$ or 221,073, 919,720,733,357,899,776. This number of unique locations is more than adequate to cover any reasonably sized sensor, using the smallest hexagon size discernable by the detection device.

Other encoding means may be utilized with the hexagons. Instead of moving the hexagon vertices to the right or left, they could be moved in other directions, for example along the edges of the hexagon, or by varying amounts in any direction. Each of these approaches provides additional freedom in encoding position information into the location pattern.

Figure 4A:
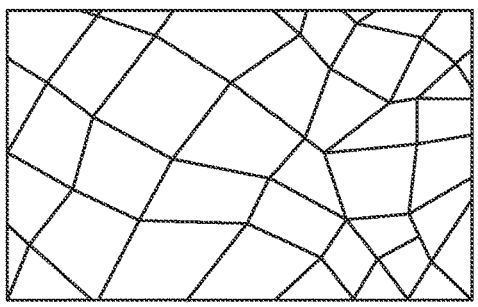
FIG. 4a schematically illustrates detail of electrodes of a touch screen.
Figure 4B:
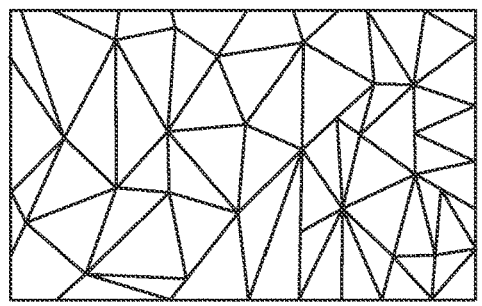
FIG. 4b schematically illustrates detail of electrodes of a touch screen.
Figure 4C:
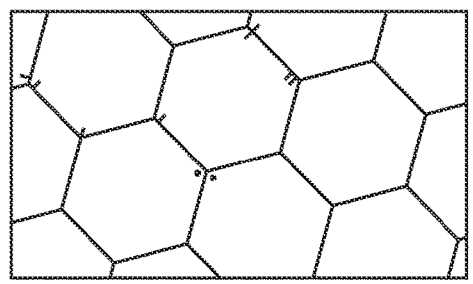
FIG. 4c schematically illustrates detail of electrodes of a touch screen.

Polygons other than hexagons may be used as micropatterns that include location patterns. For example, FIG. 4a shows 4-sided polygons, and 4b shows 3-sided polygons. FIG. 4c shows another embodiment whereby the micropattern includes additional markings, such as ticks connected to the micropattern, or dots that are electrically isolated from the micropattern, that themselves comprise unique location indicia. In such an embodiment, the micropattern itself may be comprised primarily of repeating shapes and the unique location indicia may be wholly encompassed within the placement of location ticks or dots relative to vertices of the repeating shapes, for example. Further, perturbations in vertices may be combined with ticks and dots as will be appreciated by the skilled artisan. Pettersson, earlier referenced, additionally describes how other raster patterns may be encoded with location information. Robrecht, also earlier referenced, additionally discusses how a coded pattern may be realized.

In a touch sensor construction, layer 52 may be laminated to a similarly configured layer that comprises column electrodes, the row and column electrodes separated by a dielectric layer, to form a mutual capacitive touch sensor grid. Layer 52, which includes the location pattern, may include microconductor pattern that is specially processed, formulated, or coated to be sensed by detection device 120. Some coatings which may be applicable are described in US Patent Application No. 2006/0139338 (Robrecht), which was earlier incorporated by reference. The corresponding layer may not include such coating, or may comprise some other material that does not include a micropattern (such as a conductive oxide configured into continuous bars). Layer 52 may comprise either the column or row electrodes, and is preferably oriented as the top layer (of the two layers that form the mutual capacitive matrix sensor—that is, positioned between the user and the layer containing electrodes that do not include the location pattern). Of course, other layers may be included as well, such as glass overlays between the top electrode layer and the user, or hardcoats.

In addition to a mutual capacitive-based grid, which includes row electrodes and column electrodes, separated by a dielectric and forming a matrix, a continuous, single electrode layer of microconductor pattern may be used with traditional ratio metric methods to determine touch location information. These ratio metric methods coupled with a single continuous layer are sometimes referred to as surface capacitive technology, and are well known in the industry.

Single layer constructions are also possible with a matrix-type mutual capacitive touch screen having row and column electrodes. Such constructions typically have full row electrodes disposed as a first layer on a substrate, and between the row electrodes, electrically isolated portions of column electrodes that are on the same first layer of the substrate. Dielectrics, such as optically clear adhesive, is selectively applied to the portions of the row electrodes where the isolated portions of the column electrodes need to bridge the row electrodes, then a conductor, such as a conductive oxide, is further applied between the isolated portions of the column electrodes, thus bridging the row electrodes and forming column electrodes. In such a construction, the first layer electrodes (both row and column) may be comprised of microconductors that include a location pattern (the areas in between such electrodes having a discontinuous pattern that similarly includes the location pattern), and the bridges may comprise a conductor that detection device 160 is configured not to detect or is invisible to detection device 160 (such as a transparent conductive oxide).

Figure 5:
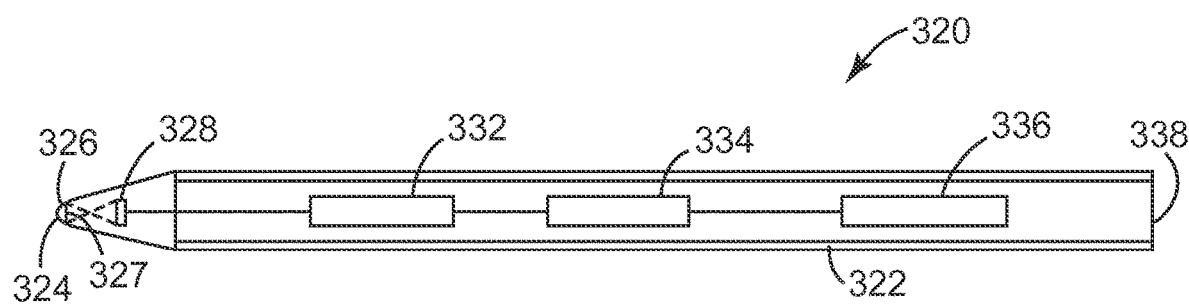
FIG. 5 schematically illustrates a detection device that is fashioned as a stylus.

FIG. 5 schematically illustrates a detection device 320 fashioned as a stylus. It includes a housing 322 having a tip 324 and a back 338. The tip 324 includes an aperture 326 for receiving (and in some embodiments emitting) radiation for discerning the coded pattern. A lens 327 can be included to focus the radiation on an imaging device 328. Information from the imaging device can be decoded by a decoding circuit 332, and the signals generated can be transmitted to the system electronics by a data transmitting unit 334. A power source 336 can also be provided so that the stylus 320 can be a stand-alone, non-tethered item. Power source 336 can be a fully self-contained power source such as a battery, or can be an RF pumped power circuit activated by an RF signal originating from a location remote from the stylus.

The detection device 320 can additionally be used to detect and record stylus strokes whether the stylus is used in connection with location encoded conductive micropattern or not. For example, the stylus can include a retractable inking tip that can be used to write on paper. If the paper is printed with a coded pattern that can be detected by the detection stylus, the stylus positions while writing can be recorded in a storage device located in the stylus. Optionally, the information can be communicated via wire or wireless connection to the host system or other device for processing, recording and/or storage. Connecting the stylus to the computer by docking it or otherwise making connection to the computer (via wire or wireless connection) allows the stored stylus stroke information to be loaded onto the computer. Optionally, stylus strokes can be recorded and stored in a memory device contained within the stylus even when the stylus is used in connection with the digitizer overlay, for example for easy portability of the information to another computer device.

Figure 6:
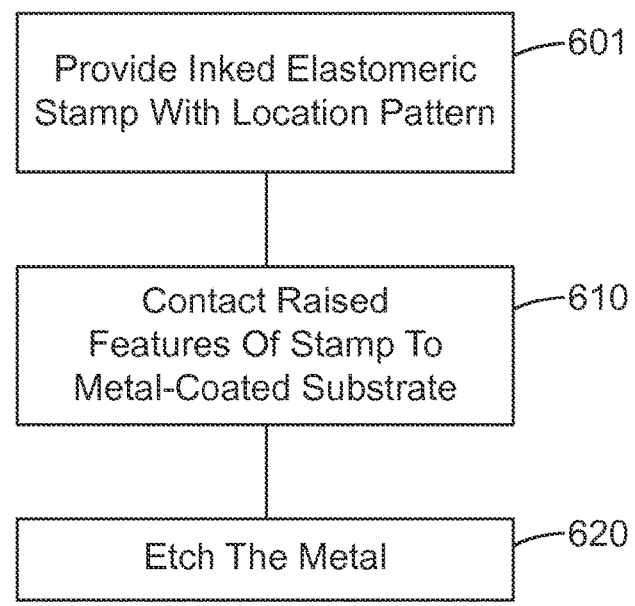
FIG. 6 is a flowchart illustrating a method of manufacturing an element for a touch screen.

FIG. 6 is a flowchart illustrating a method of manufacturing a element for a touch screen. The process is further detailed in US Patent Application Publication No. 2009-0218310 (Zu et al.) which was earlier incorporated by reference in its entirety.

An inked elastomeric stamp that includes a location pattern is first provided (step 601). Next, the raised features of the stamp are contacted with a metal-coated substrate (step 610), thus transferring the inked portions to the metal-coated substrate. Finally, the metal not coated with the ink is etched away (620) leaving portions of the metal-coated substrate that form the location pattern.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. An electrode layer comprising:
a plurality of conductive traces arranged in a micropattern comprising a plurality of irregular polygons,
wherein each polygon of the plurality of irregular polygons comprises a plurality of vertices formed by the plurality of conductive traces, and
wherein each vertex of the plurality of vertices of each of the plurality of irregular polygons has a predetermined relative position that defines a unique location indicium among the plurality of vertices of the plurality of irregular polygons.

2. The electrode layer of claim 1, wherein the micropattern defines a plurality of electrodes arranged into rows and separated by separation rows, the plurality of polygons comprising a continuous pattern in each electrode and a discontinuous pattern in each separation row.

3. A touch sensor comprising adjacent first and second electrode layers, at least one of the first and second electrode layers being an electrode layer according to claim 1.

4. A touch sensitive system comprising:
a display;
the touch sensor of claim 3 disposed over a viewable region of the display;
system electronics configured to receive signals from the touch sensor which are indicative of capacitances between electrodes included in the touch sensor;
a stylus comprising a tip having an aperture for receiving radiation for discerning the unique location indicia, the stylus further comprising a lens, an imaging device, and a data transmitting unit, the lens configured to focus the radiation onto the imaging device, the data transmitting unit configured to transmit data from the imaging device to the system electronics.

5. The touch sensitive system of claim 4, wherein the stylus further comprises a decoding circuit configured to decode signals from the imaging device to determine therefrom coordinates of the tip of the stylus relative to the touch sensor, the data transmitted to the system electronics by the data transmitting unit comprising the coordinates.

6. The touch sensitive system of claim 4, wherein the system electronics are configured to decode the data transmitted to the system electronics by the data transmitting unit and to determine therefrom coordinates of the tip of the stylus relative to the touch sensor.

7. The touch sensitive system of claim 4 being configured to determine a position of the tip of the stylus relative to the touch sensor and being further configured to show on the display information indicative of the determined position.

8. The electrode layer of claim 1, wherein each polygon in the plurality of irregular polygons is a hexagon.

9. The electrode layer of claim 1, wherein each vertex in the plurality of vertices has a displacement from a position of a corresponding vertex in a regular array of polygons selected from a same set of five predetermined displacements.

10. The electrode layer of claim 1, wherein the traces have a width between about 1 and 10 micrometers.

11. The electrode layer of claim 10, wherein the traces are comprised of a metal.

12. The electrode layer of claim 10, wherein the traces comprise an infrared absorbing compound.

13. A projected-capacitive touch screen comprising the touch sensor of claim 3, the adjacent first and second electrode layers defining a matrix of electrodes, the matrix of electrodes defining a touch-sensitive area of the projected-capacitive touch screen.

* * * * *